Dec. 5, 1967  D. B. COON  3,356,944
DECIMAL AND RANGE INDICATING MEANS FOR ELECTRICAL
MEASURING APPARATUS
Filed Nov. 23, 1964  4 Sheets-Sheet 1

INVENTOR
DONALD B. COON

BY *J. D. Douglass*
ATTORNEY

Dec. 5, 1967  D. B. COON  3,356,944
DECIMAL AND RANGE INDICATING MEANS FOR ELECTRICAL
MEASURING APPARATUS
Filed Nov. 23, 1964  4 Sheets-Sheet 2

INVENTOR
DONALD B. COON

BY *J. D. Douglass*

ATTORNEY

Dec. 5, 1967        D. B. COON        3,356,944
DECIMAL AND RANGE INDICATING MEANS FOR ELECTRICAL
MEASURING APPARATUS
Filed Nov. 23, 1964        4 Sheets-Sheet 3

INVENTOR
DONALD B. COON

BY J. D. Douglass
ATTORNEY

Dec. 5, 1967  D. B. COON  3,356,944
DECIMAL AND RANGE INDICATING MEANS FOR ELECTRICAL
MEASURING APPARATUS
Filed Nov. 23, 1964  4 Sheets-Sheet 4

INVENTOR
DONALD B. COON

BY J. D. Douglass

ATTORNEY

United States Patent Office 3,356,944
Patented Dec. 5, 1967

3,356,944
DECIMAL AND RANGE INDICATING MEANS FOR ELECTRICAL MEASURING APPARATUS
Donald B. Coon, Warrensville Heights, Ohio, assignor to Western Reserve Electronics Inc., Cleveland, Ohio, a corporation of Ohio
Filed Nov. 23, 1964, Ser. No. 413,218
12 Claims. (Cl. 324—98)

ABSTRACT OF THE DISCLOSURE

A plurality of digit wheels which have portions extending through an escutcheon plate whereby they may be manually operated independently of each other. Each digit wheel has a multiple switch connected to and operated thereby to insert discrete resistances into an electrical circuit. The indicia on the digit wheels which is representative of the quantity being measured are visible through window openings in the escutcheon plate.

A range switch is disposed below the escutcheon plate with an operative knob above the plate. The range switch has a plate with a plurality of dwells disposed around the periphery. To the left of each digit wheel is an opening. Slidable bars are provided below each of the openings and each has a zone of contrasting color arranged to be reciprocated into register with an opening. Levers are connected to each bar and held in spring pressed engagement with the periphery of the range switch plate. The decimal indication is thus changed for each position of the range switch.

An operational mode lever is provided extended below the escutcheon and connected to a switch to change the mode of operation. Above the range switch is an opening which registers with indicia on the range switch. A flag connected to the mode lever is arranged to open or close the range indicia opening.

---

The present invention relates to new and novel electrical measuring apparatus, and more particularly to electrical measuring apparatus associated with a passive measurement system and adapted to indicate all of the basic electrical parameters such as DC and AC voltage, DC current and resistance.

The electrical measuring apparatus of the present invention incorporates a novel switch and indicating arrangement which is particularly designed to eliminate the human factor of scale misinterpretation in reading conventional electrical meters. The apparatus of the present invention is associated with a measurement system that can be specified to an inherent accuracy expressed as a percent of indicated value rather than percent of full-scale value. The invention apparatus is adapted to provide measurement at an accuracy of 1% of the indicated value with a three significant figure representation, including the proper positioning of the decimal point and the indication of the measurement units.

In addition to the provision of a conventional analog scale interpretation, the apparatus provides an in-line, easy-to-read, three significant figure representation of the measured function, decimal indicating mechanism being provided for automatically properly positioning the decimal point in accordance with movements of the range switch of the apparatus.

The range switch also has associated therewith mechanism for providing a visual indication of the measurement units and the particular electrical function being measured.

The apparatus includes a mode switch which permits the instrument to be first employed in a search mode wherein a rough reading can be obtained from the more or less conventional meter dial. The instrument can then be switched into the digital mode wherepon the digital switch means including a plurality of manually operated wheel-like members can be operated to provide the final reading to three significant figures. This digital switch means includes digit indicating means which provides an in-line direct presentation of the measurement in large, easy-to-read numerals. At the same time, the decimal point indicating means automatically is positioned so as to indicate the decimal point as properly positioned relative to the three significant digits.

The control means which controls operation of the decimal indicating mechanism also has electrical function indicating means thereon for providing a visible indication of the particular electrical function being measured. Masking means is operatively associated with the mode switch means to expose the function indicating means only when the apparatus is in use in the digital mode.

The over-all combination of positive readings and identification incorporated in the various components virtually eliminates misinterpretation and provide exact repeatability of the measuring operation. Indexing means is also operatively associated with the range switch means and the digital switch means to ensure that accurate indexing movement thereof is obtained so as to provide accurate readout from the apparatus.

An object of the present invention is to provide new and novel electrical measuring apparatus which is adapted to measure and indicate different electrical functions.

Another object of the invention is to provide electrical measuring apparatus incorporating a unique indicating mechanism which substantially eliminates the human factor of scale misinterpretation normally involved in reading meters employed for measuring electrical functions.

A further object of the invention is the provision of electrical measuring apparatus which provides a visual indication of the measurement unit.

A still further object of the invention is to provide electrical measuring apparatus which provides an in-line, easy-to-read three significant figure representation of the measured function.

A still further object of the invention is the provision of electrical measuring apparatus including a multi-figure representation wherein means is provided for automatically indicating the proper position of the decimal point with respect to the multi-figure representation.

Other objects and many attendant advantages of the invention will become more apparent when considered in connection with the specification and accompanying drawings, wherein:

Figure 1:
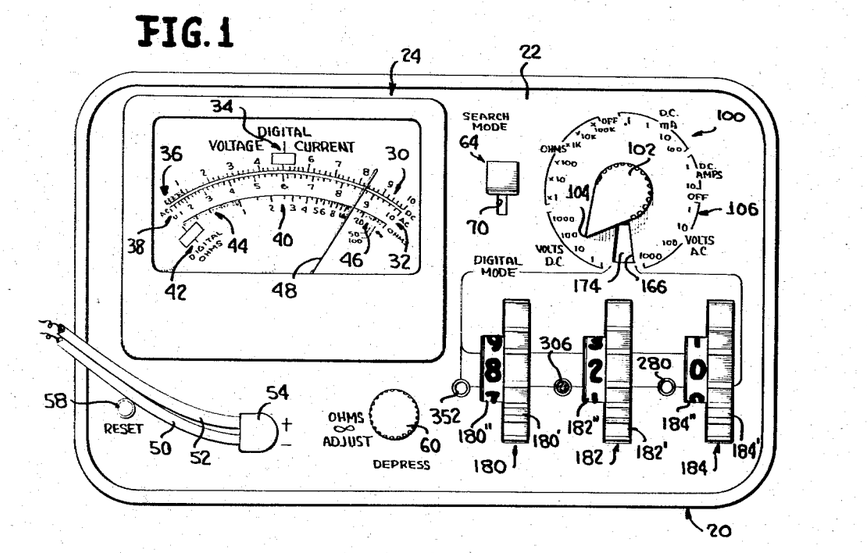
FIG. 1 is a top view of an instrument incorporating the electrical measuring apparatus of the present invention illustrating the apparatus at one stage of the measuring operation.
Figure 2:
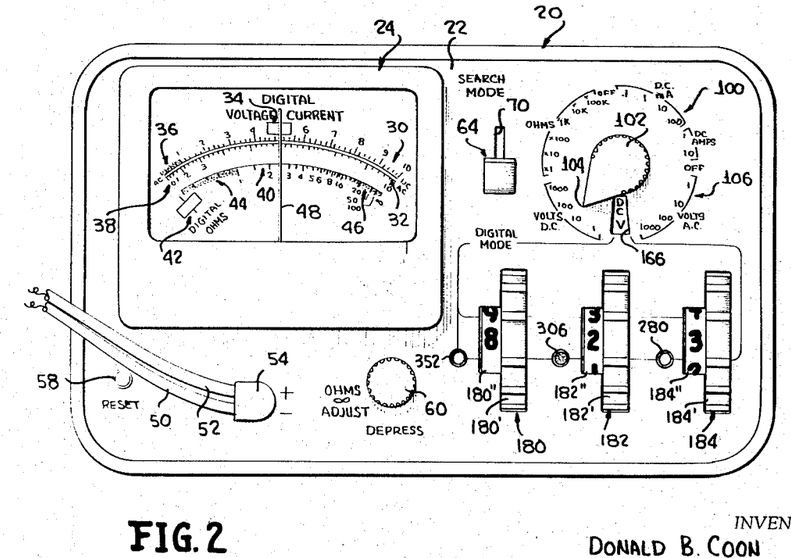
FIG. 2 is a view similar to FIG. 1 illustrating the apparatus at a further stage in the operation of the apparatus.

Referring now to the drawings wherein like reference characters designate corresponding parts throughout the several views, an instrument incorporating the present invention is illustrated in FIGS. 1 and 2 wherein an outer protective carrying case is indicated generally by reference numeral 20, this case preferably being of a shock resistant, lightweight insulating material such as fiber glass and the like which is readily portable and which may be provided with a handle for carrying it from place to place. The instrument includes an upper plate means 22, and the multimeter dial is indicated generally by reference numeral 24, this dial having a plurality of scales thereon as hereinafter described for indicating various electrical functions.

Dial 24 is connected in an electrical network including a circuit for measuring potential and current including an AC or DC analog conversion network delivering a varying current to the indicator associated with dial 24 for interpretation in a conventional manner in the search mode use of the apparatus, and also including a three-digit-wheel conversion network which delivers a fixed quantity of DC or AC current to the indicator when in the digital mode of operation. The circuit for measuring potential and current may be of the type illustrated in copending U.S. patent application Ser. No. 229,186, filed Oct. 3, 1962.

The indicator associated with dial 24 is also connected with a resistance measuring circuit wherein in the search mode of operation measurement is made with a power-limited shunt ohmmeter circuit specifically designed to provide a minimum disturbance for safe measurements in semi-conductor circuitry, and wherein in a digital mode of operation, measurement is made with a Wheatstone bridge.

The resistance measuring circuit may be of the type disclosed in copending U.S. patent application Ser. No. 310,385, filed Sept. 20, 1963.

Dial 24 includes an upper scale indicated generally by reference numeral 30 which indicates values from zero to ten and which is adapted to indicate either voltage or current readings when employed with a source of DC electrical energy. A second scale indicated generally by reference numeral 32 is disposed immediately below scale 30 and is adapted to indicate voltage or current when employing the apparatus with a source of AC electrical energy. A target indicated generally by reference numeral 34 is provided, and the purpose thereof will be hereinafter explained. Shaded areas 36 and 38 are provided on scales 30 and 32 for a purpose hereinafter described.

A third scale indicated generally by reference numeral 40 is positioned beneath the two upper scales, and a target 42 is provided for use in conjunction with scale 40, this scale and target being employed when measuring resistance. Scale 40 is provided with shaded areas 44 and 46, it being noted that the portion of scale 40 between the values of one and ten is unshaded, while the over-all scale extends from a value of zero to infinity. A conventional indicating needle 48 is provided for obtaining readings from the scales hereinbefore described.

A pair of test leads 50 and 52 of stranded copper wire are provided with suitable insulating covering and are terminated at one end with a plug means indicated by reference numeral 54 which may be of the slim-line banana plug type. These test leads may terminate in any suitable connector means for connecting the apparatus to the suitable electrical means to be tested.

The over-all measurement system is protected against overload with a disconnect relay, and this relay is adapted to be electrically reset by means of a reset button indicated by reference numeral 58 which extends above plate means 22.

An ohms infinity adjust knob indicated generally by reference numeral 60 is operated by depressing the knob and suitably turning it to adjust needle 48 in the usual manner as hereinafter more fully described.

Figure 6:
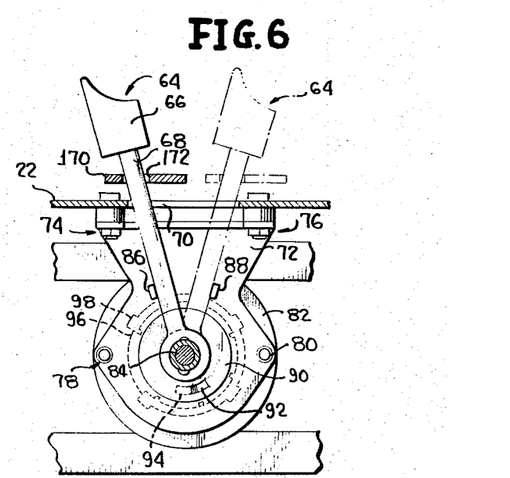
FIG. 6 is a sectional view taken substantially along line 6—6 of FIG. 3 looking in the direction of the arrows.

A two position mode switch means is indicated generally by reference numeral 64, the mode switch means being shown in its search mode position in FIG. 1 and in its digital mode position in FIG. 2. As seen in FIG. 6, mode switch 64 includes a manually engageable upper insulating portion 66 which is secured to an elongated bar member 68 which is adapted to swing back and forth within an elongated slot 70 provided in plate 22.

A support bracket 72 is supported in depending relation from plate 22 by a pair of nut and bolt assemblies 74 and 76. A pair of elongated nut and bolt assemblies 78 and 80 are adapted to support a plurality of contact support discs one of which is visible in FIG. 6 and is indicated by reference numeral 82. The lower end of bar member 68 is fixedly attached to a shaft 84 rotatably supported by the support bracket 72 and which is also mounted for rotation with respect to the disc 82. Swinging movement of the mode switch is limited to stop members 86 and 88 which are fixed to the support bracket 72. The mode switch is swingable between the full line position shown in FIG. 6 and the phantom line position as illustrated.

A disc-like spring member 90 is secured to shaft 84 and is provided with a laterally extending projection 92 which extends away from the viewer as seen in FIG. 6 and which is adapted to cooperate with a projection 94 extending outwardly toward the viewer from the bracket member 72. Members 92 and 94 cooperate to provide a detent mechanism for holding the mode switch means in either of its two limit positions as illustrated in FIG. 6. A plurality of disc-like members 96 are fixed to shaft 84 and carry contact means 98 thereon which are adapted to cooperate with contact means mounted on the discs 82 for making and breaking suitable electrical contacts for connecting the circuitry either in its search mode position or its digital mode position.

Referring again to FIGS. 1 and 2, range switch means is indicated generally by reference numeral 100 and includes a selector portion 102 extending above plate means 22, the selector portion being of electrical insulating material having a sharp pointer portion 104 formed thereon and also being provided with serrations on the outer surface thereof to facilitate manual gripping thereof. This selector portion is adapted to cooperate with range indicating means indicated generally by reference numeral 106, this range indicating means comprising suitable indicia formed on plate means 22 for indicating the particular range at which the instrument is adapted to operate at any given selected position of the range switch means. It will be noted reading from the bottom of the range indicating means 106 and proceeding clockwise that the ranges indicate the electrical functions of D.C. voltage, resistance in ohms, D.C. current in milliamperes, D.C. current in amperes and A.C. voltage, the indicating means also providing a visual indication of the values of these various electrical functions.

Figure 11:
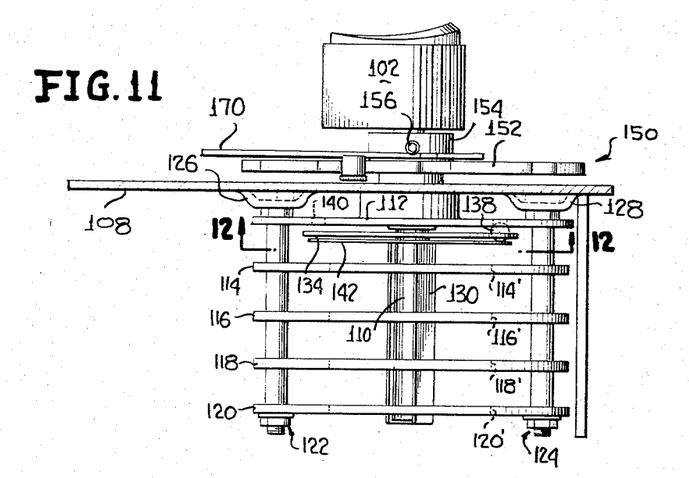
FIG. 11 is a sectional view taken substantially along line 11—11 of FIG. 5 looking in the direction of the arrows.
Figure 12:
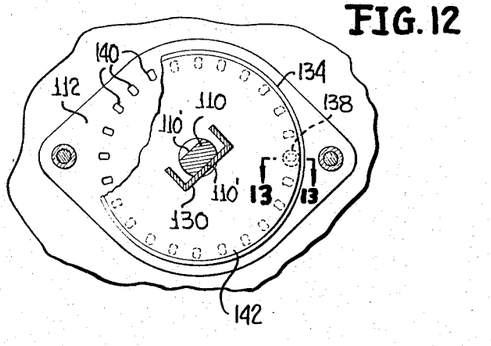
FIG. 12 is a sectional view partly broken away and taken substantially along line 12—12 of FIG. 11 looking in the direction of the arrows.
Figure 13:
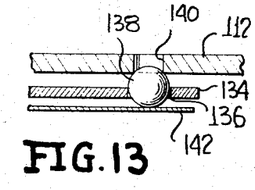
FIG. 13 is a sectional view taken substantially along line 13—13 of FIG. 12 looking in the direction of the arrows.

As seen most clearly in FIGS. 11 through 13 inclusive, the selective portion 102 of the range switch means is secured to a shaft 110 having opposite flats 110' formed on the outer surface thereof, shaft 110 being rotatably supported within a bracket 112 supported along with disc-like members 114, 116, 118 and 120 in spaced relationship beneath a plate 108, such plate being adapted for mounting within the casing in a suitable manner. Nut and bolt assemblies 122 and 124 are provided for holding members 112–120 in spaced relationship, the upper ends of the bolts being mounted within recessed portions 126 and 128 provided in plate 108. A plurality of disc members 114', 116', 118' and 120' are mounted for movement within correspondingly formed openings provided in members 114, 116, 118 and 120 respectively, the members 114', 116', 118' and 120' being secured for movement on shaft 110 by means of a channel member 130 adapted to fit snugly up against one of the flats formed on shaft 110 and also being received within rectangular openings provided in each of the disc members. Members 114–120 and members 114'–120' respectively are provided with suitable electrical contacts for moving the circuitry into the various range positions.

Detent mechanism is provided for holding the range switch means in any particular range position, this detent mechanism including a carrier disc 134 which is mounted for rotation with shaft 110 and which has a hole 136 formed therein which loosely receives a detent ball 138 of hardened metallic material. This ball 138 is adapted to be received within any one of a number of spaced holes 140 provided within the support bracket member 112. A resilient spring-like disc member 142 is also mounted for movement with shaft 110 and is adapted to engage the lower surface of detent ball 138 for urging the ball upwardly into engagement with one of the holes 140 provided in bracket 112. It is apparent that the cooperation between ball 138 and the holes 140 will provide a detent mechanism for holding shaft 110 within any one of its adjusted positions, there being a hole 140 for each of the positions indicated by the range indicating means 106 aforedescribed. The range switch means may be moved simply by grasping the selective portion 102 thereof and manually turning the range switch such that the ball 138 will be cammed out of any particular hole 140 upon the application of suitable pressure.

A control means for the decimal indicating mechanism hereinafter described is indicated generally by reference numeral 150, this control means including a flat plate-like member 152 having a central mounting portion 154 which is received on shaft 110 and secured thereto as by a set screw 156 and the like. As seen particularly in FIGS. 3–5, the outer peripheral control edge portion of member 152 is provided with a plurality of substantially symmetrically disposed and spaced projections 158 and depressions 160 for a purpose hereinafter described. The upper surface of member 152 is also provided with function indicating means thereon which may be printed on the plate, this function indicating means being visible through an opening 166 provided in plate 22. As shown in FIG. 2, the function indicating means is visible through window 166, the function indicating means being masked off from view in FIG. 1 by a masking means hereinafter described.

Turning again to FIGS. 3–5, the masking means is indicated by reference numeral 170 and includes a thin flat plate member of irregular configuration, member 170 having a hole 172 formed therein at one end thereof as illustrated in FIG. 6, this hole loosely receiving bar member 68 of the mode switch means. A central portion of plate 170 is received upon shaft 110 and is freely pivotally supported thereby so that movement of the mode switch means will cause pivotal movement of plate 170.

Plate 170 also includes a masking end portion 174 which is adapted to swing into position under window 166 at plate 22 and over the function indicating means provided on the control means whereby the function indicating means can be masked off from view. It is apparent that the position of the masking means is accordingly dependent upon the position of the mode switch means. The arrangement is such that when the mode switch means is in the search mode position as shown in FIG. 1, masking portion 174 will be disposed directly under window 166 to mask off the function indicating means provided on the control means. On the other hand, when the mode switch means is switched into the digital mode position as shown in FIG. 2, the masking means is swung into the position shown in FIGS. 3–5 wherein the masking end portion 174 is disposed to one side of window 166, whereby the function indicating means is readily visible through window 166 as shown in FIG. 2 of the drawings.

Three digital switch means are indicated generally by reference numerals 180, 182 and 184, each of these digital switch means including a manually engageable portion 180', 182' and 184' respectively and also including digit indicating means 180", 182" and 184" respectively which is connected for movement therewith, each of these digital switch means being more or less in the form of a wheel and being rotatable on the common shaft as hereinafter described. The manual engageable portions 180', 182' and 184' are provided with notches on the outer periphery thereof for receiving a person's fingers and for permitting ready indexing movement of these switch means, the indicating means being provided with suitable digits thereon for providing readout from the apparatus. The indicating means 180" has the digits 1 through 9 inclusive formed on the outer periphery thereof, indicating means 182" having the digits zero through 9 inclusive formed thereon and indicating means 184" having the digits zero through 10 inclusive formed thereon.

As seen in FIGS. 1 and 2, plate 22 is provided with suitable cutout portions such that the manual engageable parts of the digital switch means may extend a substantial distance above the plate means, cutout portions also being provided in overlying relationship to the digit indicating means such that an in-line readout can be obtained with a three digit presentation.

Referring now particularly to FIGS. 7 through 10 inclusive, the manner of mounting the digital switch means will be more clearly understood. A central common shaft 190 is provided about which each of the visual switch means is adapted to rotate. As seen particularly in FIG. 7, a bracket member 192 is secured to the undersurface of plate 108 by means of nut and bolt assemblies 194. A flat insulating member 196 is provided upon which a number of resistors 196' are supported at either side thereof by suitable contact members mounted on member 196. A pair of contact supporting insulating members of flat construction are indicated by reference numerals 198 and 200 and are supported at opposite sides of member 196. Members 196, 198 and 200 may each be supported by a pair of nut and bolt assemblies from bracket 192, this support means being eliminated for the sake of clarity in FIG. 7.

Figure 7:
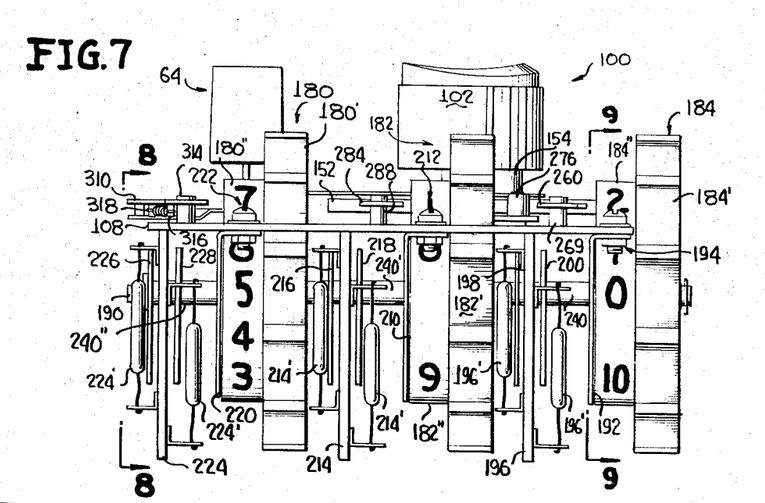
FIG. 7 is a front view on an enlarged scale of the apparatus shown in FIG. 3.

A bracket member 210 similar to bracket member 192 is supported by nut and bolt assemblies 212, and a flat support member 214 is similar to support member 196. A plurality of resistors 214' are supported from suitable contact means at either side of member 214. A pair of contact support members 216 and 218 are provided at opposite sides of member 214 and correspond to the members 198 and 200 previously discussed.

A third bracket member 220 is secured to the undersurface of plate 108 by nut and bolt assemblies 222, a support member 224 being provided which is similar to member 214, member 224 supporting resistors 224' from suitable contacts provided at opposite sides thereof. A pair of members 226 and 228 correspond to members 216 and 218 respectively and are supported at opposite sides of member 224.

It will be understood that each of the digital switch means assemblies are substantially identical in construction, and that various contacts thereof as well as the resistors supported in these assemblies are suitably connected in the circuit to provide the desired results.

Figures 8, 9:
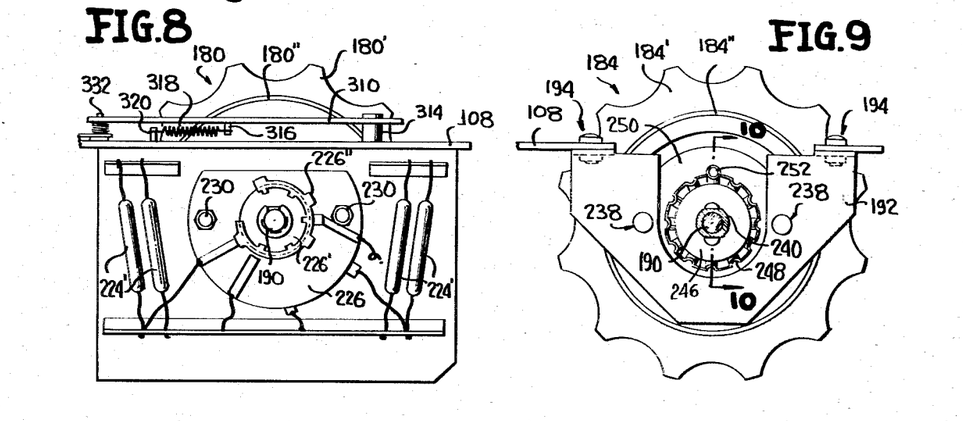
FIG. 8 is a view taken substantially along line 8—8 of FIG. 7 looking in the direction of the arrows.
FIG. 9 is a sectional view taken substantially along line 9—9 of FIG. 7 looking in the direction of the arrows.

Whereas the mounting nut and bolt assemblies for the contact support members of the digital switch means have been eliminated in FIG. 7, a pair of such assemblies are indicated by reference numerals 230 in FIG. 8, it being understood that these nut and bolt assemblies serve to support members 224, 226 and 228 from the bracket 220.

Figure 10:
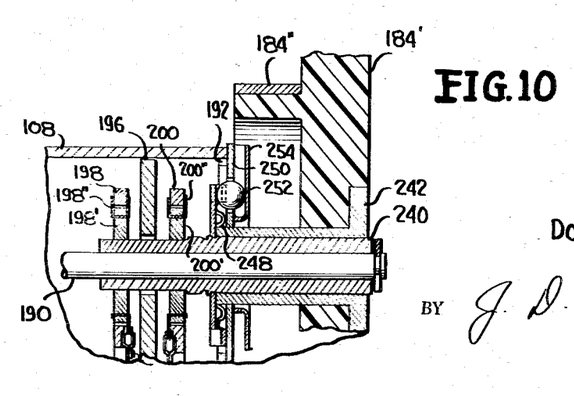
FIG. 10 is a sectional view taken substantially along line 10—10 of FIG. 9 looking in the direction of the arrows.

Referring now particularly to FIGS. 9 and 10, the assemblies for supporting members 196, 198 and 200 from bracket 192 are indicated generally by reference numerals 238. A tubular member 240 is mounted for rotation about shaft 190 and is further mounted for rotation with respect to members 196 and 192. A member 242 is fixed to tubular member 240 and in turn is fixed to the portion 184' of digital switch means 184 so that members 184', 242 and 240 rotate in unison. A plate member 246 is provided with an edge portion 248 defining a plurality of arcuate recesses therein which are adapted to receive a ball 252 which is mounted within a suitable hole provided in member 250 supported by bracket 192 in fixed relationship. A spring member 254 supported from member 250 engages ball 252 and normally urges it toward member 246 to urge the ball into one of the recesses provided in the outer edge 248 of member 246.

It is apparent that members 246, 252 and 254 cooperate to form an indexing mechanism to provide indexing movement of the switch 184 in a step-by-step manner between the positions determined by the movement of ball 252 into one of the recesses provided in edge 248 of member 246.

It should be understood that each of the digital switch means is provided with an indexing mechanism similar to that discussed in connection with the digital switch means 184 and as illustrated in FIGS. 9 and 10.

As seen particularly in FIG. 10, a pair of spaced disc-like members 198' and 200' are disposed within central openings provided in members 198 and 200 respectively, members 198' and 200' being provided with contacts 198" and 200" which may be of substantially U-shaped cross sectional configuration as seen in FIG. 10 so as to engage suitable contacts provided on the opposite sides of members 198 and 200 respectively. Tubular member 240 may be provided with a non-circular cross sectional configuration which fits within cooperating complementary holes provided through members 198' and 200' such that members 198' and 200' are mounted for rotation with tubular member 240 and other components operatively connected therewith. It will be understood that members similar to members 198' and 200' are associated with each of the individual digital switch means and are mounted for movement within the associated members for making and breaking the contact as the digital switch means are rotated about their common axis. As seen in FIG. 8, the disc-like member 226' which is associated with member 226 is visible, member 226' being provided with contacts 226" thereon. As seen in FIG. 7, member 240' is similar to member 240 and is operatively connected with the digital switch means 182, and member 240" is also similar to member 240 and is operatively connected with digital switch means 180.

It is accordingly clear that each of the digital switch means is independently mounted with respect to the other digital switch means and is independently operable. The digital switch means are suitably connected in the circuitry as shown for example in the two copending patent applications referred to hereinbefore.

Figure 3:
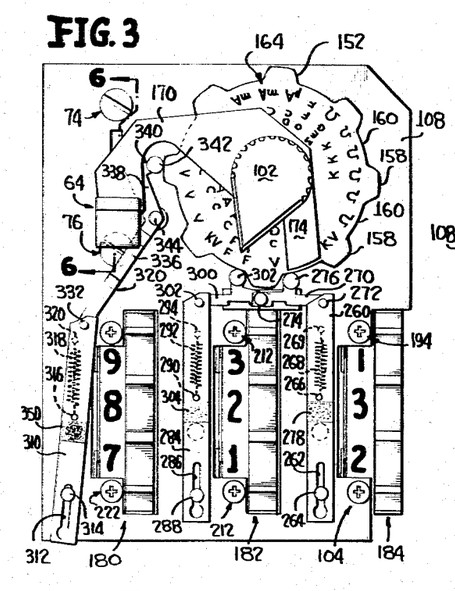
FIG. 3 is a top view of the measurement indicating mechanism with the plate means removed from overlying relationship with respect thereto and illustrating a first position of the control means and associated decimal indicating mechanism.

Referring now particularly to FIG. 3, the decimal indicating mechanism of the present invention includes a first bar-like member 260 having a guide slot 262 formed therein which receives a pin 264 secured to plate 108 and extending upwardly therefrom, slot 262 having an enlarged portion at the bottom of the slot as seen in FIG. 3 for permitting initial assembly of these components. A pin 266 depends from the underside of bar 260 and receives one end of a tension spring 268 the opposite end of which is connected to a pin 269 fixed to plate 108 whereby the bar 260 is normally urged in an upward direction as seen in FIG. 3.

The upper end of bar 260 is connected to a link 270 by a pivot pin 272, the opposite end of link 270 being pivotally supported upon a pin 274 fixed to plate 108. Link 270 also supports on an offset portion thereof a follower roller 276 which is mounted for rotation and which engages the outer periphery of control member 152 whereby roller 276 moves in a swinging movement about the pivot point 274 to move the bar 260 upwardly and downwardly into different positions from that shown in FIG. 3. As shown, the bar 260 is at the limit of its upward movement with roller 276 disposed within one of the recesses 160 formed on the outer periphery of control member 152.

The upper surface of bar 260 is provided with a portion 278 which may be suitably colored as in red, and immediately beneath this red colored portion, either the natural color of the metal bar 260 may be employed, or a suitable color such as gray may be placed on the upper surface. These different colored portions are adapted to be visibly seen through a cutout portion 280 illustrated in FIGS. 1 and 2, this cutout portion representing the position of the decimal point between the last two significant figures of the digital switch means.

Referring again to FIG. 3, a second bar member 284 is provided, this bar member having an elongated guide slot 286 formed therein which receives a pin 288 having an enlarged head formed thereon. Here again, slot 286 is provided with an enlarged portion at the lower end thereof for receiving the head of the pin. A pin 290 depends from bar 284 and receives one end of a tension spring 292 the opposite end of which is secured to a pin 294 extending upwardly from plate 108. Spring 292 normally urges bar 284 in an upward direction as seen in FIG. 3.

The upper end of bar 284 is pivotally connected to a link 300 by means of a pivot pin 302, the opposite end of link 300 also being pivotally supported upon pin 274 previously described. A follower roller 302 is rotatably supported on link 300 on an offset portion thereof and is adapted to engaged the outer periphery of control member 152. As shown in FIG. 3, bar member 284 is in its uppermost limit of movement.

Bar 284 is provided with a colored portion 304 similar to portion 278 for visibly indicating the position of the decimal point, portion 304 being visible at times through a cutout 306 provided in plate 22 as seen in FIGS. 1 and 2.

A third bar 310 is provided, this bar having an elongated guide slot 312 formed therein which receives a guide pin 314 secured to and extending upwardly from plate 108, pin 314 also having an enlarged head thereon which is adapted to be received within an enlarged lower portion of slot 312.

A pin 316 depends from bar 310 and is connected with one end of a tension spring 318 the opposite end of which is fixed to a pin 320 extending upwardly from plate 108. Accordingly, bar 310 is normally biased in an upward direction as seen in FIG. 3.

Figure 14:
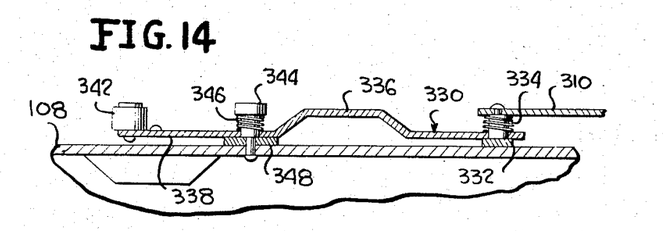
FIG. 14 is a sectional view taken substantially along line 14—14 of FIG. 5 looking in the direction of the arrows.

As seen most clearly in FIGS. 3 and 14, the upper end of bar 310 is pivotally interconnected with one end of a link 330 by means of a pin 332. It will be noted that a small spring member 334 may be disposed around the pin 332 to permit a certain amount of play between these pivotally interconnected members. Similar spring members may be provided about pins 272, 274 and 302 previously described.

Link 330 is provided with an upwardly deflected portion 336 to provide clearance with one of the nut and bolt assemblies 76. Link 336 also includes an offset portion 338 which in turn joins with a further offset portion 340 having a follower roller rotatably supported thereon and engageable with the outer surface of member 152.

Link member 330 is also pivotally supported by a pin member 344 which is fixed to plate 108, a spring member 346 being disposed about pin member 344 as seen in FIG. 14. In addition, a small spacer member 348 may be disposed beneath link 330 for maintaining it in spaced relationship above the surface of plate 108.

Bar 310 is provided with a colored portion 350 which may be red as the aforementioned colored portions, this portion 350 being visible through a cutout 352 provided in plate 22 for providing the decimal point for the first significant digit of the digital switch means.

Operation

Let it be assumed that it is desired to measure a D.C. voltage of unknown value. The mode selector switch is first moved to the search mode position as shown in FIG. 1 of the drawings. The range switch is then moved in the D.C. voltage range as indicated on plate 22 in cooperation with selector 102 to a setting that gives an indication greater than 1 on the top meter scale 30. In other words, the needle must read out of the shaded portion 36. The analog reading is then estimated and the digital switch means is set to the estimated reading. As illustrated, it is assumed that the actual final reading is 8.23 volts, and accordingly needle 48 is shown to be in the position of approximately 8.2. The first digital switch means 180 is accordingly set to 8 as indicated in FIG. 1 and the second digital switch means 182 is set to 2 as shown. It will be noted that in this particular position of the range switch, the decimal indicating mechanism is in the position shown in FIG. 4 wherein the bar 284 is moved into such a position that the colored portion 304 thereof is adapted to underlie the cutout 306 of the plate 22. The cutout portions in the plate are indicated in phantom lines in each of FIGS. 3, 4 and 5 so as to indicate which of the various cutout portions will provide an indication that the decimal point is to be positioned at that location. As seen in FIG. 3, bar 310 is positioned beneath its cutout, and in FIG. 5, bar 260 is positioned beneath its cutout.

After setting the digital switch means to the position shown in FIG. 1, the mode switch means is moved into the digital mode position shown in FIG. 2. The needle is then resolved to the target 34 using the digital switch means from left to right. As indicated in FIG. 2, digital switch means 184 has been moved into position so that the numeral 3 reads out therefrom, and the needle is properly centered on the target 34. Accordingly, as seen in FIG. 2, the final digital readout is 8.23 volts. The units of readout can be read in window or cutout 166 immediately above the digital switch means.

The very same procedure is followed when it is desired to measure an AC voltage, the only slight difference being that the needle must be moved out of the shaded area 38 of scale 32 by means of the range switch before proceeding with the operation.

If it is desired to measure a resistance of unknown value, the mode switch means is first switched to the search mode and an ohms range is selected by the selector means that gives an indication between 1 and 10 on the bottom meter scale 40. The ohms infinity adjust knob 60 is then depressed and rotated until needle 48 is on the infinity mark of the scale 40. Knob 60 is then released and the needle 48 will provide the meter analog indication. The digital switch means can then be moved to the approximate meter analog indication. The mode switch means is then switched to the digital mode position as shown in FIG. 2, and needle 48 is resolved to the target 42 so as to provide the final digital readout.

It will be noted that whereas the function indicating means on the control means is blocked off from view in FIG. 1 by the masking means, it is visible in FIG. 2 when the mode switch means is moved into the digital mode position, the position of the masking means being similarly illustrated in FIG. 3.

Figure 4:
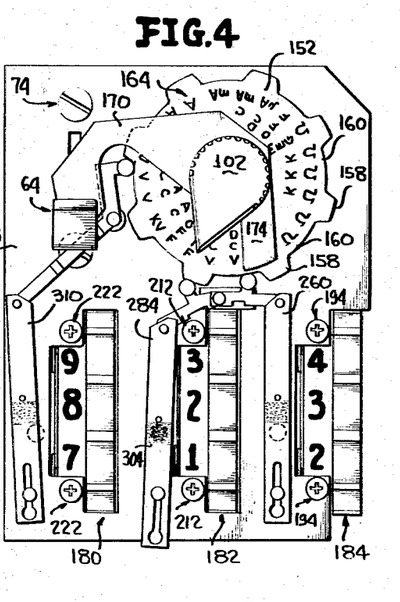
FIG. 4 is a view similar to FIG. 3 illustrating a different position of the component.
Figure 5:
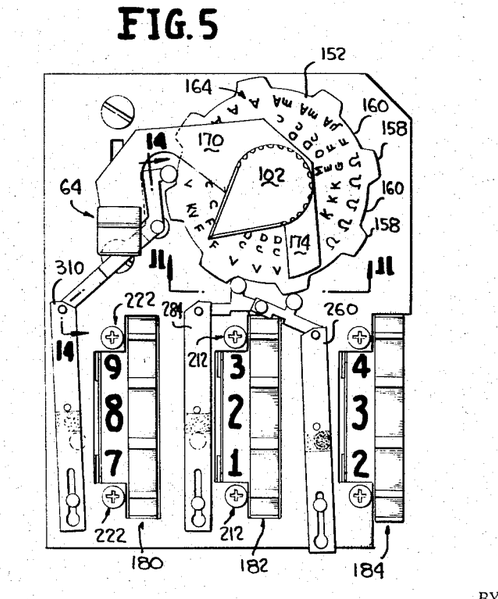
FIG. 5 is a view similar to FIG. 4 illustrating a still further different position of the components.

It is apparent from an inspection of FIGS. 3–5 inclusive that movement of the range switch means causes movement of the control means which in turn adjusts the position of the various bar members of the decimal indicating mechanism so that the decimal point will always be properly indicated in an automatic manner. All three possible positions of the bar members of the decimal indicating mechanism are illustrated in FIGS. 3–5 inclusive, and further rotation of the selector portion of the range switch means will cause a duplication of these positions.

It is apparent from the foregoing that there is provided according to the present invention a new and novel electrical measuring apparatus which is adapted to measure and indicate different electrical functions. The indicating and readout mechanism substantially eliminates the human factor of scale misinterpretation. The apparatus provides a visual indication of the measurement units which are clearly visible in the window provided immediately above the digital switch means, and the digital switch means itself provides an easy-to-read, in-line, three significant figure representation including automatic positioning of the decimal point relative to the three significant figures.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Electrical measuring apparatus including support means, a plurality of manually operable digital switch means independently movably supported by said support means, digit indicating means associated with each of said switch means, said switch means being in alignment with one another such that the digit indicating means associated therewith provides an in-line visible readout, decimal indicating mechanism including a plurality of movable portions, there being at least one movable portion associated with each of said digit indicating means, each of said movable portions having indicating means thereon for indicating the position of the decimal point with respect to said digit indicating means, means guiding said movable portions of the decimal indicating mechanism with respect to said digit indicating means, and control means operatively connected with said movable portions for controlling the position of the movable portions so as to properly indicate the position of the decimal point with respect to the digit indicating means.

2. Electrical measuring apparatus including support means, a plurality of manually operable digital switch means independently movably supported by said support means, each of said switch means having indexing means associated therewith for permitting indexing movement of the individual switch means independently of one another, each of said switch means having digit indicating means connected therewith and movable therewith, said switch means being mounted for rotation about a common axis and providing an in-line readily visible readout of the digit indicating means connected therewith, decimal indicating mechanism including a plurality of movable portions, at least one movable portion being disposed adjacent to and movable with respect to each of said digit indicating means, guide means for guiding movement of each of said movable portions, resilient means normally biasing said movable portions in one direction, decimal indicating mechanism control means movably supported by said support means, said movable portions being operatively connected with said control means through the intermediary of a pivoted linkage arrangement.

3. Electrical measuring apparatus comprising support means, range switch means movably supported by said support means, control means operatively connected with said range switch means and movable therewith, a plurality of digital switch means movably supported by said support means, each of said digital switch means having digit indicating means connected therewith and movable therewith to provide a visible indication of the position of the associated digital switch means, said digital switch means being aligned with one another so as to provide an in-line readout of the associated digit indicating means, decimal indicating mechanism including a plurality of movable portions supported by said support means, said movable portions each being associated with and disposed closely adjacent to one of said digit indicating means and being movable with respect thereto, each of said movable portions being operatively connected with said control means such that movement of said range switch means and the associated control means causes movement of said movable portions of the decimal indicating mechanism to properly position said movable portions in accordance with movement of said control means, each of said movable portions having indicating means thereon for indicating the position of the decimal point with respect to the digit indicating means of the digital switch means.

4. Apparatus as defined in claim 3 wherein said range switch means includes a manually movable selector portion, and range indicating means supported by said support means and said selector portion being movable with respect to said range indicating means whereby the range indicating means provides a visible indication of the particular position of the range switch means.

5. Apparatus as defined in claim 3 wherein said control means has function indicating means thereon for indicating the particular electrical function being measured.

6. Apparatus as defined in claim 5 including indexing mechanism operatively connected with said range switch means to permit indexing movement thereof.

7. Electrical measuring apparatus including support means, range switch means movably supported by said support means, indexing mechanism connected with said range switch means to permit indexing movement thereof, said range switch means including a manually movable selector portion, range indicating means supported adjacent said selector portion for indicating the particular position of the range switch means, control means operatively connected with said range switch means and movable therewith, said control means including an outer edge portion defining spaced outwardly extending projections, said control means having function indicating means disposed thereon for indicating the particular electrical function being measured, a plurality of digital switch means rotatably supported about a common axis by said support means, each of said digital switch means having indexing means connected therewith for permitting indexing movement thereof, each of said digital switch means having digit indicating means operatively connected therewith and movable therewith, each of said digital switch means being movable independently of one another, the digit indicating means providing an in-line readily visible readout of the position of the digital switch means, decimal indicating mechanism including a plurality of movable portions, at least one of said portions being movably mounted adjacent each of said digit indicating means, said movable portions having indicating means thereon for indicating the position of the decimal point relative to the digit indicating means of the various digital switch means, means for guiding movement of the movable portions of said decimal indicating mechanism, resilient means normally biasing said movable portions in one direction, a pivotally supported linkage operatively connected with each of said movable portions and including a portion engaging said control edge portion of the control means whereby the position of the individual movable portions of the decimal indicating mechanism is controlled by the position of the range switch means and the control means operatively connected therewith.

8. Apparatus as defined in claim 7 including plate means disposed in overlying relationship to said control means and said decimal indicating mechanism, said plate means having cutout portions for exposing portions of each of said digit indicating means, said plate means also having cutout portions adjacent said last-mentioned cutout portions for exposing portions of the movable portions of the decimal indicating mechanism so as to provide a visible indication of the proper position of the decimal point with respect to the digit indicating means.

9. Apparatus as defined in claim 8 wherein said plate means also includes a cutout portion adjacent the function indicating means of said control means for providing a visible indication of the electrical function being measured.

10. Electrical measuring apparatus comprising support means, range switch means movably supported by said support means, control means connected with said range switch means and movable therewith, said control means having function indicating means thereon, plate means disposed in overlying relationship to said function indicating means and having a cutout portion for exposing a particular portion of said function indicating means at any one time, mode switch means movably supported by said support means, masking means operatively connected with said mode switch means and positioned to mask off said cutout portion in one position of the mode switch means and to unmask said cutout portion at another position of said mode switch means, a plurality of digital switch means movably supported by said support means, digit indicating means connected with each of said digital switch means and movable therewith, decimal indicating mechanism movably supported by said support means including a plurality of independently movable portions each of which is associated with one of said digit indicating means, said movable portions having indicating means thereon for indicating the position of the decimal point with respect to said digit indicating means, means operatively connecting each of said movable portions of the decimal indicating mechanism with said control means for controlling the position of each of said movable portions in acordance with the position of said range switch means.

11. Apparatus as defined in claim 10 wherein said masking means includes a pivotally mounted member disposed in overlying relationship to said control means, said pivotally mounted member being operatively connected with said mode switch means for pivotal movement in accordance with the movement of said mode switch means.

12. Electrical measuring apparatus comprising support means, mode switch means movably supported by said support means, plate means supported by said support means, range switch means rotatably supported by said support means, said range switch means including a selector portion extending above said plate means and being manually movable, said plate means having range indicating means thereon for indicating the particular position of the range switch means, control means operatively connected with said range switch means and movable therewith, said control means having function indicating means on the upper surface thereof, said plate means having a cutout portion in overlying relationship to said control means for exposing a particular portion of said function indicating means, indexing means operatively connected with said range switch means to permit indexing movement thereof, masking means operatively connected with said mode switch means and movable therewith, said masking means being disposed in overlying relationship to said control means and movable beneath said cutout portion to mask off said cutout portion, a plurality of digital switch means rotatably supported by said support means, said digital switch means being mounted about a common axis of rotation, said digital switch means including manually engageable portions, indexing means connected with each of said digital switch means for permitting indexing movement thereof, digit indicating means operatively connected with each of said digital switch means and providing an in-line readily visible readout, said plate means having cutout portions therein through which said manually engageable portions of the digital switch means extend, said plate means also including cutout portions exposing certain portions of said digit indicating means to permit ready readout, decimal indicating mechanism movably supported by said support means and being disposed beneath said plate means, said decimal indicating mechanism including a plurality of movable portions each of which has indicating means thereon for indicating the position of the decimal point with respect to said digit indicating means, said plate means having cutout portions formed therein for exposing the indicating means of said movable portions, guide means for guiding movement of the movable portions of said decimal indicating mechanism, resilient means normally biasing said movable portions in one direction, a pivotally supported linkage connecting said movable portions with said control means for controlling the position of said movable portions independently of one another in accordance with the position of said control means and the range switch means operatively connected therewith.

References Cited

UNITED STATES PATENTS

| | | | |
|---|---|---|---|
| 2,329,218 | 9/1943 | Reynolds | 235—63 |
| 2,651,755 | 9/1953 | Triplett | 324—115 |
| 2,872,641 | 2/1959 | Hudson et al. | 324—115 X |
| 2,930,030 | 3/1960 | Hirose | 324—99 |
| 3,209,257 | 9/1965 | Miller | 324—115 |

RUDOLPH V ROLINEC, *Primary Examiner.*

WALTER L. CARLSON, *Examiner.*

E. F. KARLSEN, *Assistant Examiner.*